(12) United States Patent
Pedersen (10) Patent No.: US 9,815,123 B2
(45) Date of Patent: Nov. 14, 2017

(54) BOTTOM CUTTING STEP UP REAMER (71) Applicant: The Boeing Company, Chicago, IL (US)

(72) Inventor: Aaron J. Pedersen, Summerville, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/807,489

(22) Filed: Jul. 23, 2015

(65) Prior Publication Data

US 2017/0021433 A1 Jan. 26, 2017

(51) Int. Cl.
*B23D 77/00* (2006.01)
*B23B 51/00* (2006.01)
*B23D 77/14* (2006.01)

(52) U.S. Cl.
CPC ........ *B23B 51/009* (2013.01); *B23B 51/0018* (2013.01); *B23D 77/00* (2013.01); *B23D 77/14* (2013.01); *B23B 2251/18* (2013.01); *B23B 2251/204* (2013.01); *B23B 2251/285* (2013.01); *B23D 2277/82* (2013.01)

(58) Field of Classification Search
CPC .......... B23B 51/0018; B23B 2251/204; B23B 2251/285; B23D 2277/203; B23D 77/12; B23D 77/00; B23D 2277/82
See application file for complete search history.

(56) References Cited

U.S. PATENT DOCUMENTS

| | | | | |
|---|---|---|---|---|
| 1,249,240 A | * | 12/1917 | Summers | B23D 77/00 408/216 |
| 2,753,740 A | * | 7/1956 | Marx | B23B 47/28 408/115 R |
| 3,169,417 A | * | 2/1965 | Andreasson | B23B 51/0486 408/226 |
| 3,182,531 A | * | 5/1965 | Moore | B23D 77/00 408/229 |
| 3,543,613 A | * | 12/1970 | Obloy | B23D 77/006 407/11 |
| 3,591,302 A | * | 7/1971 | Andreasson | B23B 51/06 408/224 |
| 5,282,705 A | | 2/1994 | Shiga et al. | |
| 6,379,090 B1 | | 4/2002 | Halley et al. | |

(Continued)

FOREIGN PATENT DOCUMENTS

DE 69901643 T2 1/2003
DE 102008025962 A1 12/2009

(Continued)

OTHER PUBLICATIONS http://www.hannibalcarbide.com/technical-support/reamers/stocked-step.php.
http://www.hannibalcarbide.com/carbide-tipped-tools/end-mills/center-cutting/straight-flutes/for-steels/312F/.
http://www.hannibalcarbide.com/carbide-tipped-tools/reamers/step/straight-flute-long-carbide/458ST/.

*Primary Examiner* — Alan Snyder (74) *Attorney, Agent, or Firm* — Felix L. Fischer (57) ABSTRACT

A bottom cutting step up reamer incorporates a shaft having a first end with attachment features adapted to be received in a chuck. A plurality of bottom cutting edges substantially perpendicular to the shaft are located at a second end distal from the first end. At least one step up land is provided proximate the plurality of bottom cutting edges and spaced toward the first end with a plurality of parallel cutting edges substantially parallel to the shaft.

18 Claims, 8 Drawing Sheets

(56) References Cited

U.S. PATENT DOCUMENTS

| | | | |
|---|---|---|---|
| 8,708,618 B2 * | 4/2014 | Hobohm | B23D 77/00 408/1 R |
| 2003/0156912 A1 * | 8/2003 | Ono | B23D 77/00 408/229 |
| 2006/0037786 A1 * | 2/2006 | Takikawa | B23B 51/0018 175/394 |
| 2007/0269282 A1 | 11/2007 | Agapiou | |
| 2008/0152445 A1 * | 6/2008 | Jensen | B23D 77/006 408/145 |
| 2012/0051863 A1 * | 3/2012 | Craig | B23B 51/08 408/1 R |
| 2012/0251256 A1 * | 10/2012 | Shea | B23D 77/02 408/145 |

FOREIGN PATENT DOCUMENTS

| | | | | |
|---|---|---|---|---|
| EP | 1611982 A1 | | 1/2006 | |
| FR | 2590191 A1 * | | 5/1987 | B23B 51/108 |
| JP | 61061704 A * | | 3/1986 | B23B 35/00 |
| JP | 05220608 A * | | 8/1993 | |
| LI | DE 3817806 A1 * | | 12/1989 | B23B 51/0018 |

\* cited by examiner

BOTTOM CUTTING STEP UP REAMER

BACKGROUND INFORMATION

Field

Embodiments of the disclosure relate generally to the field of machine tools and more particularly to a bottom cutter step up reamer having a bottom cutting surface with a plurality of increasing diameter cutting lands for reaming to a diameter.

Background

Machining of holes in fabricated structures may be accomplished with various tools including drill bits or bottom cutters. Damaged holes may occur due to multiple drill starts or miss-positioning. Traditionally there are two separate tools used for attempted repair of such holes but each tool has a different outcome with respect to attempted repair. A bottom cutter may be employed which makes its own path to clean up damaged areas and oversize damaged areas. However, the forward face is the cutting surface and sides of the outer diameter of the tool are the same size as the cutting surface and tend to make a clean hole but oversized. Three step reamers which are an alternative repair tool do not have a forward cutting surface but a conical point for alignment with a preexisting hole. If the point of the reamer aligns with a path it will go that way whether it was intended direction or not and the step cutting landings will take two additional steps up to reach the final size. Reamers are great tools to set up sizes with one tool but making anew path is not possible without a forward cutting surface.

It is therefore desirable to provide a repair tool for damaged holes which allows creating a centered path for repair of a damaged hole with step up cutting for desired full diameter without oversizing the repaired hole.

SUMMARY

Embodiments disclosed herein provide a bottom cutting step up reamer incorporating a shaft having a first end with attachment features adapted to be received in a chuck. A plurality of bottom cutting edges substantially perpendicular to the shaft are located at a second end distal from the first end. At least one step up land is provided proximate the plurality of bottom cutting edges and spaced toward the first end with a plurality of parallel cutting edges substantially parallel to the shaft.

A method for hole repair is provided by the exemplary embodiments wherein a hole is selected for repair and a repair diameter is defined. A bottom cutting step up reamer is then selected, with a bottom cutter integrated on a shaft with step up reamer lands with a maximum step up land diameter equal to or slightly larger than the repair diameter. A centerline of the shaft of the bottom cutting step up reamer is aligned with a center point on the repair diameter. A new hole start is then created with the bottom cutter and a final hole diameter created by enlarging expansion holes with the parallel cutting edges on the step up reamer lands.

The features, functions, and advantages that have been discussed can be achieved independently in various embodiments of the present disclosure or may be combined in yet other embodiments further details of which can be seen with reference to the following description and drawings.

DETAILED DESCRIPTION

Figure 1:
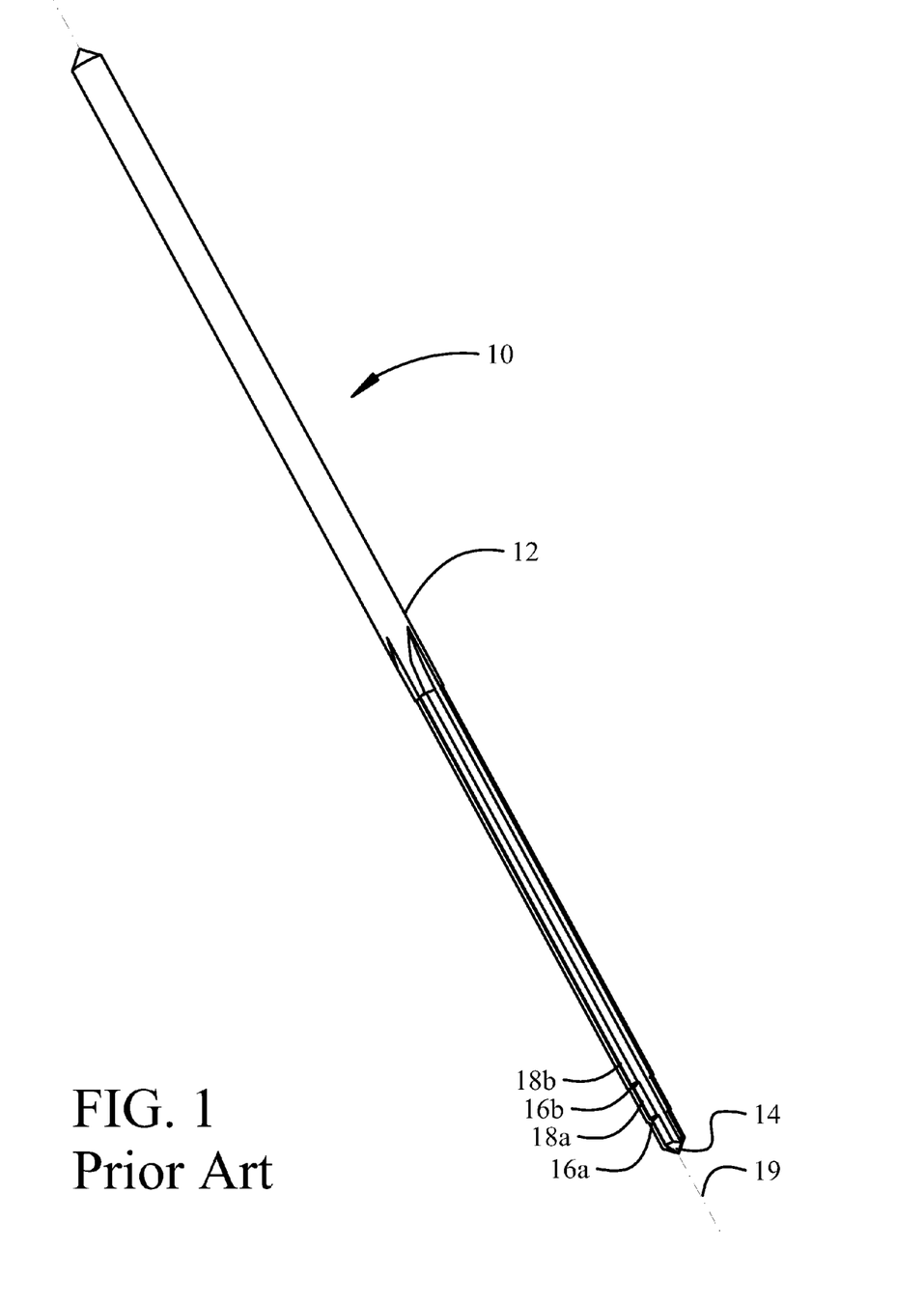
FIG. 1 is side view of a prior art reamer.
Figure 2:
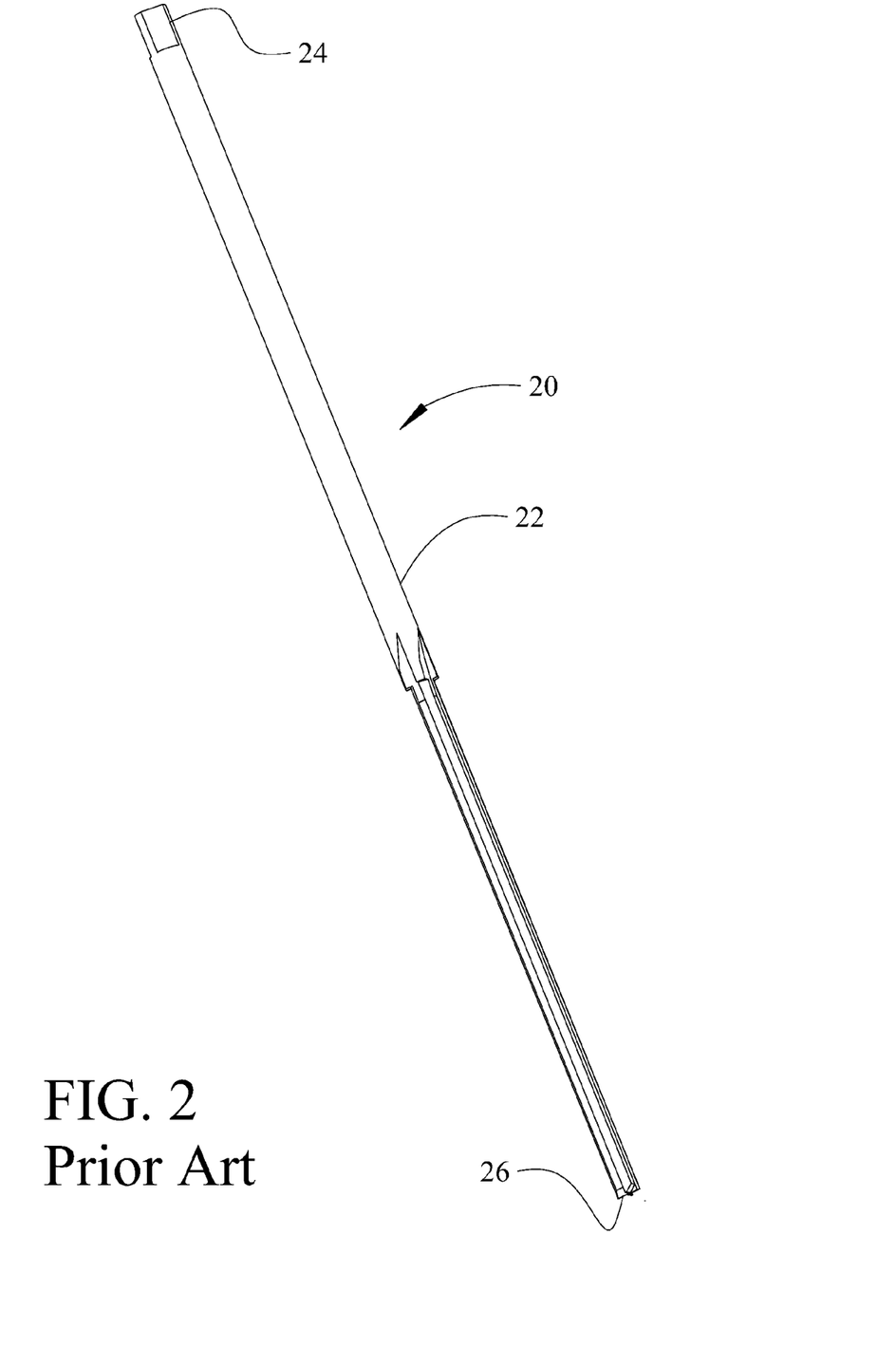
FIG. 2 is a perspective view of a prior art bottom cutter.

Embodiments disclosed herein provide a bottom cutting step up reamer which incorporates a shaft with a first end adapted to be engaged in a drill motor, drill press or other machine tool, a first cutting edge substantially perpendicular to the shaft at a second end distal from the first end and multiple lands of increasing diameter between the first end and a body of the shaft, each land having associated cutting edges for increasing hole size. Referring to the drawings, FIG. 1 shows a prior art reamer which has previously been employed for repair of deformed or damaged holes in a structure. The reamer 10 has a shaft 12 and a tip 14 which is typically substantially conical in shape. Two lands 16a and 16b of increasing diameter are located on the shaft above the tip 14. Each land has a plurality of side cutting edges 18a, 18b which are substantially parallel to a shaft centerline 19. FIG. 2 shows a prior art bottom cutter 20 which has been employed alternatively to or in conjunction with the prior art reamer for repair of deformed or damaged holes. The bottom cutter 20 also has a shaft 22 and, at an end distal from an attachment element 24 on the shaft, a plurality of cutting edges 26 extend substantially perpendicular to the shaft.

Figure 3A:
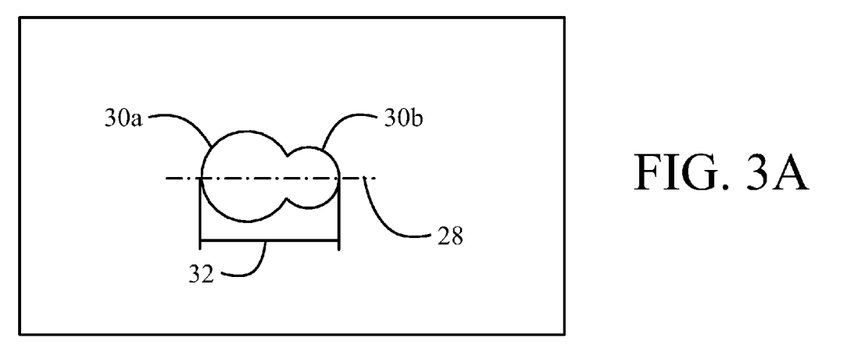
FIG. 3A is a top view of an exemplary hole deformation in a manufactured article.
Figure 3B:
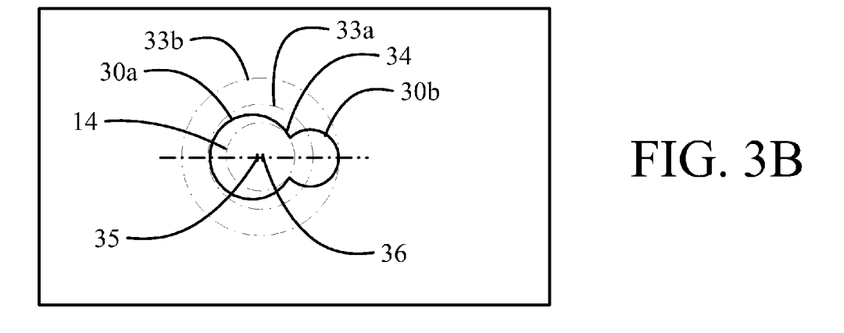
FIG. 3B is a top view showing relative cutting circumferences for a prior art reamer employed for repair of the hole deformation depicted in FIG. 3A.

FIG. 3A depicts a typical hole deformation (known as a "snowman" hole due to its distinctive shape). A snowman hole is typically a difficult repair due to the elongated axis 28 joining two holes 30a and 30b creating a relatively large repair diameter 32. If a prior art reamer 10 is employed for repair of the hole, the conical tip 14 which does not have any cutting elements will be deflected by an interfacing edge 34 into one hole of the snowman 30a as shown in FIG. 3B. This will result in centering the tool at a point 35 on the axis 28 which will not correspond to the center 36 of the repair diameter 32. Therefore the resulting holes 33a and 33b created concentrically around the conical tip by the reamer cutting lands 16a and 16b will be significantly larger than the overall snowman hole boundary in order to cover the entire snowman periphery.

Figure 3C:
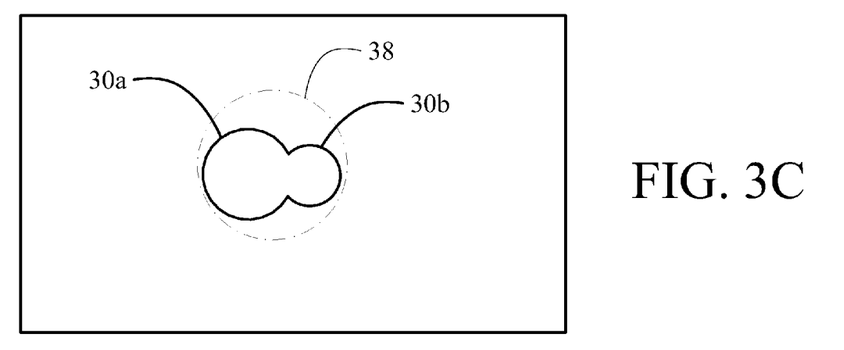
FIG. 3C is a top view showing relative cutting circumference for a prior art bottom cutter employed for repair of the hole deformation depicted in FIG. 3A.

Similarly as shown in FIG. 3C, use of a prior art bottom cutter 20 on the snowman hole will result in a hole periphery 38 that will likely be larger than the net repair diameter 32 and potentially off axis.

Figure 4:
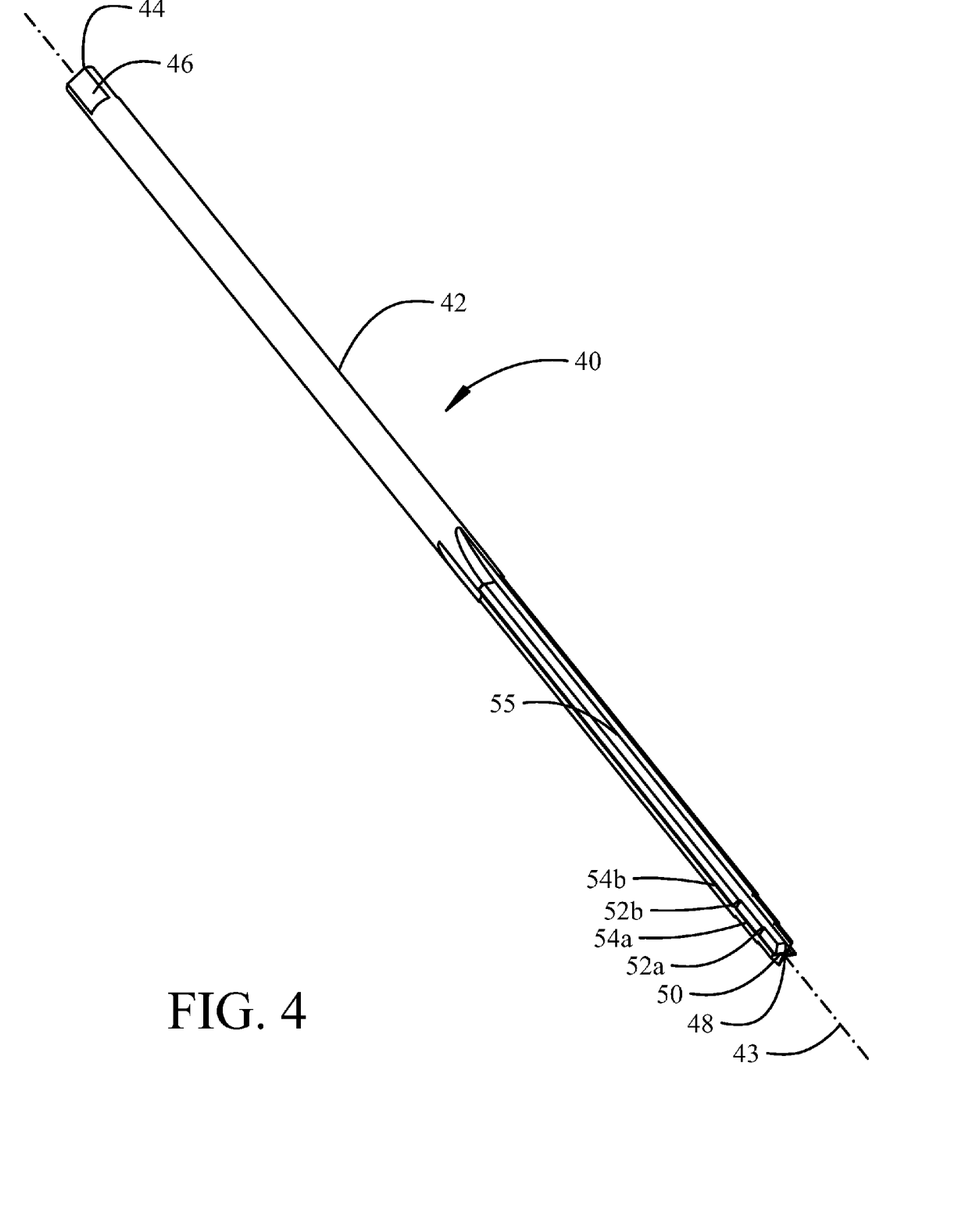
FIG. 4 is a perspective view of a bottom cutting step up reamer as disclosed herein.
Figure 5:
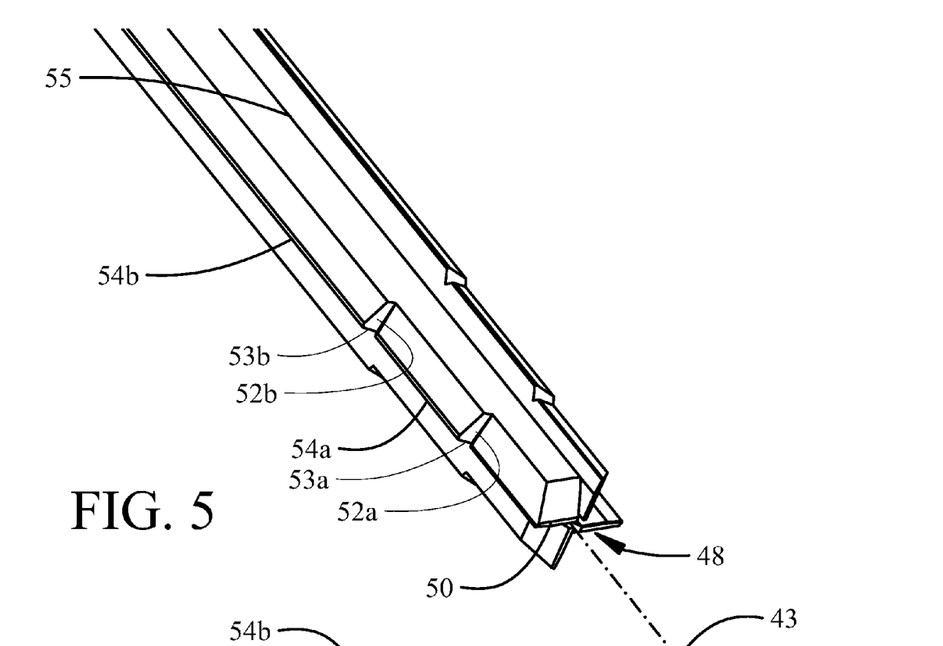
FIG. 5 is a detailed perspective view of the tip of the bottom cutting step up reamer of FIG. 4.
Figure 6:
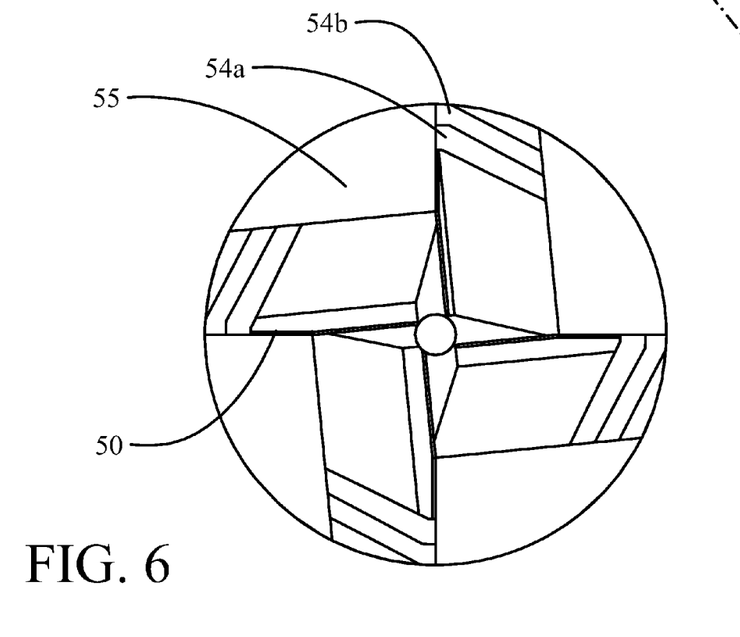
FIG. 6 is an end view of the bottom cutting step up reamer of FIG. 4.

An exemplary embodiment of a bottom cutting step up reamer 40 is shown in FIG. 4. The bottom cutting step up reamer 40 incorporates a shaft 42 which is adapted for releasably securing the tool in a chuck of a drill motor or similar device at a first end 44 which may include flats 46 or other attachment features to prevent rotation of the bottom cutting step up reamer 40 in the chuck. As seen in FIG. 4 and in detail in FIGS. 5 and 6, a second end 48 of the shaft 42, distal from the first end 44, incorporates a plurality of bottom cutting edges 50 substantially perpendicular to a centerline 43 of the shaft. Two step up lands 52a and 52b with increasing diameter are provided proximate the bottom cutting edges 50 but spaced from the second end 48 in the direction of the first end 44. The first step up land 52a has a diameter greater than the bottom cutting edges and the second step up laud 52b has a diameter greater than the first step up land. Each step up land has a plurality of angled cutting edges extending from the shaft as well as a plurality of parallel cutting edges; a plurality of first angled cutting edges 53a, a plurality of second angled cutting edges 53b, plurality of first parallel cutting edges 54a at the diameter of first laud 52a and a plurality of second parallel cutting edges 54b at the diameter of second land 52b. The parallel cutting edges are substantially parallel to the shaft centerline 43. The second parallel cutting edges 54b extend up the shaft 42 toward the second end 44 creating flutes 55 to provide chip paths for deeper hole depths. Two step up lands are shown for the embodiment in the drawings but additional step ups may be employed in alternative embodiments. Additionally, four cutting edges are shown for the bottom cutting edges, land angled cutting edges and side parallel cutting edges for the embodiment in the drawings. Fewer or more cutting edges both in the bottom cutter and step up reamer side cutters may be employed in alternative embodiments.

Figure 7A:
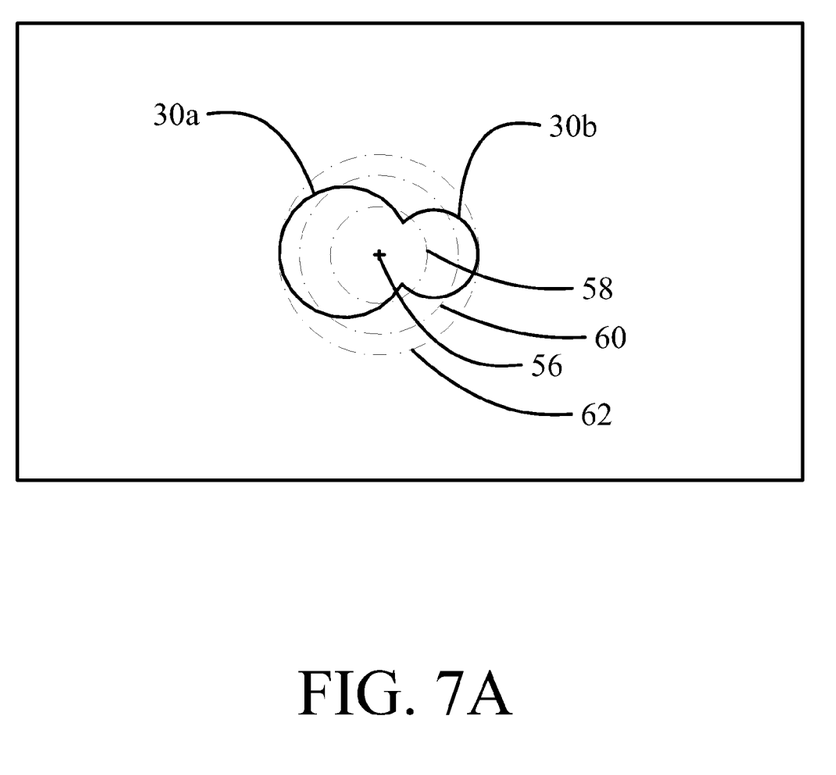
FIG. 7A is a top view showing relative cutting circumferences for the bottom cutting face and step up reamer cutting lands when employing a bottom cutting step up reamer as disclosed herein for repair of the hole deformation depicted in FIG. 3A.

As shown in FIG. 7A, the forward face bottom cutting surface provided by the bottom cutting edges 50 allows the tool to cut any path on which the centerline 43 of the shaft 42 is aligned (shown as point 56 in FIG. 7A) resulting in a new starting hole 58. Point 56 can be selected to correspond to the center of the snowman repair diameter 32 described with respect to FIG. 3A. Step up reamer side cutting features provided by angled cutting edges 35a and 53b on the lands and parallel cutting edges 54a and 54b allow for a slow step up reaming drill process aligned on the new path the bottom cutter has created which results in cleanly cut step up holes 60 and 62. Selected sizing of the ultimate diameter of second parallel cutting edges 54b allows close coverage of the snowman holes 30a and 30b with hole 62 without oversizing, as seen in FIG. 7A. While the described repair is shown with respect to a snowman hole the bottom cutting step up reamer 40 is equally applicable for use with any off-size, off-center or oblong hole by selecting a tool with a diameter of the second step up land equal to or slightly larger than a maximum repair diameter and alignment of the centerline of the shaft at a center point on the repair diameter for hole initiation with the bottom cutter.

Figure 7B:
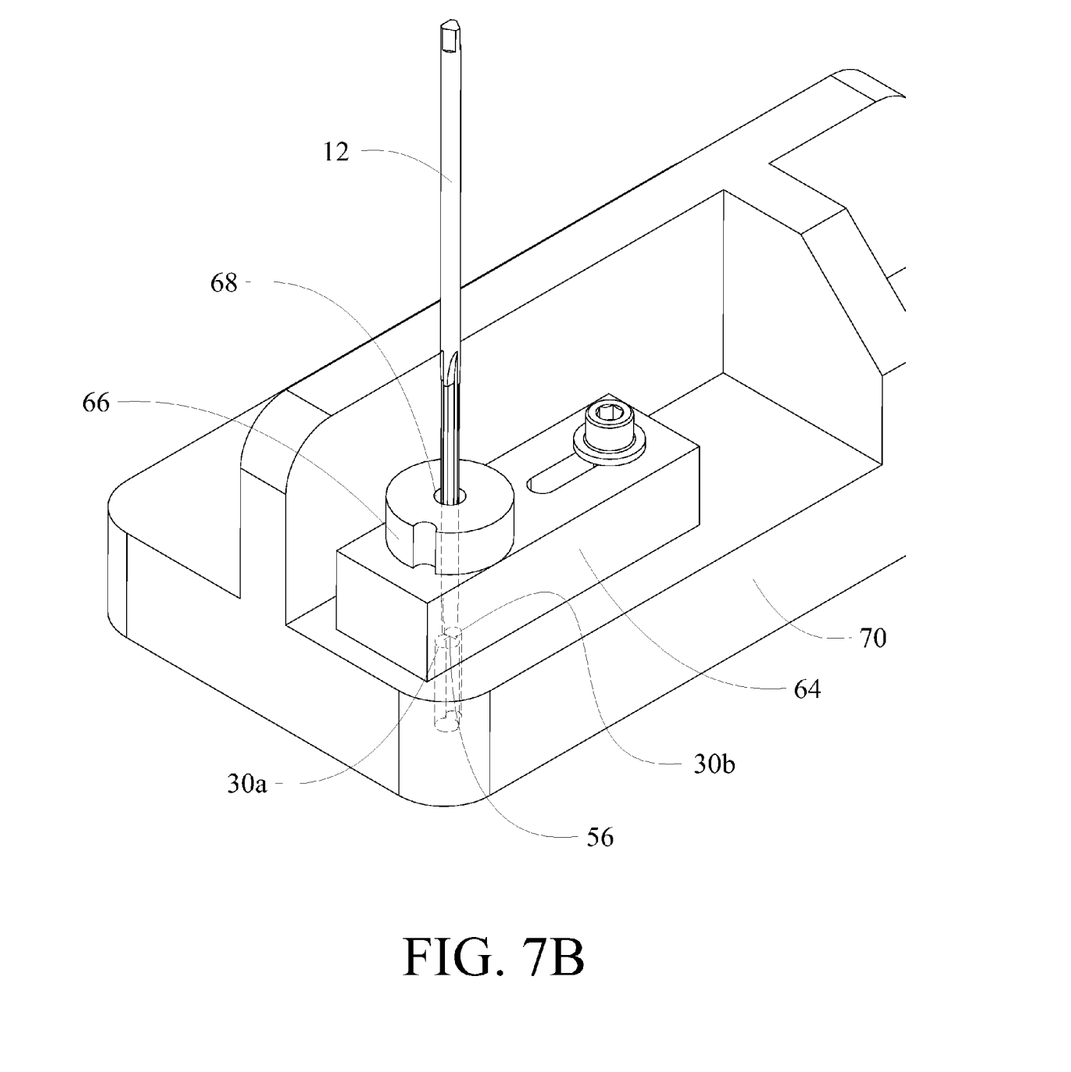
FIG. 7B is a perspective view showing placement of a snatch drift block for guiding the bottom cutting step up reamer in a snowman hole repair; and, FIG. 8 is a flow chart for a method for hole repair employing a bottom cutting step up reamer as disclosed in the embodiments herein.

To assure that the bottom cutting edges 50 of the tool remain aligned with the desired starting point 56 a snatch drill block 64 having a bushing 66 matching bore 68 to receive shaft 42 is concentrically aligned on point 56 and is locked in place on the structure 70 having the snowman hole 30a, 30b after ensuring the entire damaged area is encapsulated in the drill bushing and block as seen in FIG. 7B.

Once the drill block and bushing is located over the damaged hole and locked in place the center is now locked with no chance of movement when the bottom cutter is reestablishing the new hole. Once the new hole is cut through with the bottom cutter the bushing and block will remain locked in place and allow the reamer to step up the new hole path to the final size.

The bottom cutting step up reamer 40 can be constructed at any length with any first end features to accommodate any drill set up or chuck size. Optional lengths of the tool will allow use in all applications and sizing of the step up reamer side cutting edges will allow very accurate hole repair with minimal oversizing. Carbide cutting surface on the bottom cutting edges 50 and parallel cutting edges 54a and 54b will accommodate any material and multi material stack-ups, for example carbon fiber, titanium and aluminum parts stacks. Standard fabrication methods for carbide machining tools may be employed for the bottom cutting step up reamer embodiments disclosed.

Figure 8:
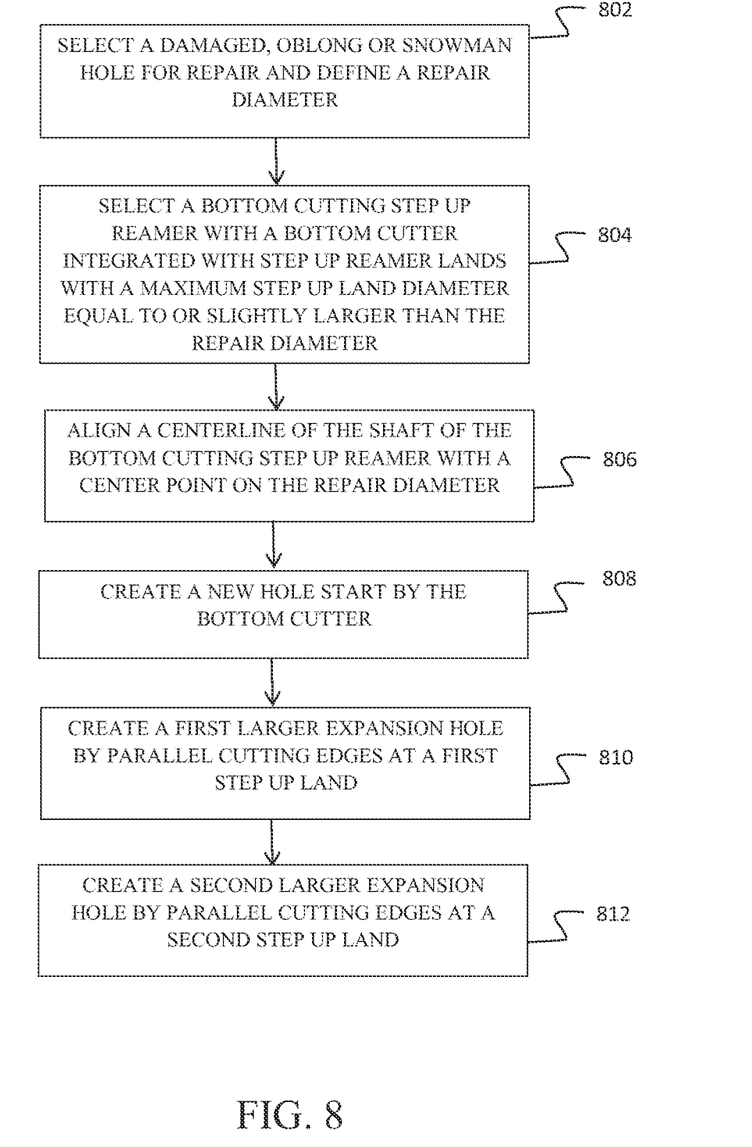

A method for hole repair using the disclosed embodiments of the bottom cutting step up reamer is shown in FIG. 8. A damaged, oblong or snowman hole is selected for repair and a repair diameter is defined, step 802. A bottom cutting step up reamer with a bottom cutter integrated with step up reamer lands is selected with a maximum step up land diameter equal to or slightly larger than the repair diameter, step 804. A centerline of the shaft of the bottom cutting step up reamer is aligned with a center point on the repair diameter, step 806, and a new hole start is created by the bottom cutter, step 808. Successively larger expansion holes are created by parallel cutting edges at a first step up land, step 810, and at a second step up land, step 812, to provide a final hole diameter approximating the desired repair diameter.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A method for hole repair comprising:
   selecting a hole for repair, said hole for repair comprising a damaged hole having an elongated axis;
   defining a repair diameter on the elongated axis, said repair diameter being the minimum possible diameter that completely encompasses the damaged hole;
   selecting a bottom cutting step up reamer with a bottom cutter integrated on a shaft having a first end with attachment features adapted to be received in a chuck and a plurality of bottom cutting edges substantially perpendicular to the shaft with step up reamer lands proximate the plurality of bottom cutting edges and spaced toward the first end having a plurality of cutting edges substantially parallel to the shaft with a maximum step up land diameter equal to or slightly larger than the repair diameter;
   aligning a centerline of the shaft of the bottom cutting step up reamer with a new center point on the repair diameter; and,
   creating a new hole start with the bottom cutter.

2. The method as defined in claim 1 further comprising creating an enlarged expansion hole with parallel cutting edges at a first step up land.

3. The method as defined in claim 2 further comprising creating a further enlarged expansion hole with parallel cutting edges at a second step up land to provide a final hole diameter approximating the desired repair diameter.

4. The method as defined in claim 1 wherein said hole for repair comprises two joined holes on the elongated axis.

5. The method as defined in claim 1 further comprising concentrically aligning a snatch drill block having a bushing with a matching bore to receive the shaft on the center point of the repair diameter established relative to the damaged hole in a structure, said snatch drill block removably locked in place on the structure.

6. The method as defined in claim 1 wherein the at least one step up land comprises a first step up land and a second step up land and further comprising creating a further enlarged expansion hole with parallel cutting edges at the second step up land to provide a final hole diameter approximating the desired repair diameter.

7. The method as defined in claim 1 wherein the at least one step up land incorporates a plurality of angled cutting edges extending from the shaft and further comprising creating an enlarged expansion hole with the angled cutting edges and a plurality of parallel cutting edges proximate the at least one step up land to provide a hole diameter approximating the desired repair diameter.

8. The method as defined in claim 7 wherein the first step up land, is proximate the bottom cutting edges and spaced toward the first end, having a diameter greater than the bottom cutting edges and a first plurality of parallel carbide cutting edges substantially parallel to the shaft and further comprising creating an enlarged expansion hole with the plurality of parallel cutting edges to provide a hole diameter approximating the desired repair diameter.

9. The method as defined in claim 8 wherein the first step up land incorporates a plurality of angled cutting edges extending from the shaft and further comprising creating the enlarged expansion hole with the plurality of angled cutting edges and the plurality of parallel cutting edges.

10. The method as defined in claim 8 wherein a second step up land is intermediate the first step up land and the first end, having a diameter greater than the first step up land and a second plurality of parallel carbide cutting edges substantially parallel to the shaft and further comprising creating the enlarged expansion hole with the plurality of parallel cutting edges to provide a final hole diameter.

11. The method as defined in claim 10 wherein the second step up land incorporates a plurality of second angled cutting edges extending from the shaft and further comprising creating the further enlarged expansion hole with the plurality of angled cutting edges and the plurality of parallel cutting edges proximate the at least one step up land.

12. The method as defined in claim 10 wherein the first plurality of parallel cutting edges comprises four cutting edges and the second plurality of parallel cutting edges comprises four cutting edges.

13. The method as defined in claim 10 wherein the parallel cutting edges extend from the second step up land toward the first end providing flutes for chip extraction.

14. The method as defined in claim 1 wherein the plurality of bottom cutting edges comprises four cutting edges.

15. The method as defined in claim 1 wherein the plurality of parallel cutting edges comprises four cutting edges.

16. The method as defined in claim 1 wherein the plurality of bottom cutting edges have carbide surfaces.

17. The method as defined in claim 1 wherein the plurality of parallel cutting edges have carbide surfaces.

18. The method as defined in claim 1 wherein the attachment features comprise a plurality of flats on the shaft and further comprising attaching the shaft in a chuck of a tool with the plurality of flats.

\* \* \* \* \*